United States Patent
Zhou et al.

(10) Patent No.: US 8,429,302 B2
(45) Date of Patent: Apr. 23, 2013

(54) AGGREGATE CONTROL FOR APPLICATION-LEVEL COMPRESSION

(75) Inventors: Qinggang Zhou, Marietta, GA (US); David Granfors, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 560 days.

(21) Appl. No.: 12/265,482

(22) Filed: Nov. 5, 2008

(65) Prior Publication Data
US 2010/0115135 A1 May 6, 2010

(51) Int. Cl.
*G06F 15/16* (2006.01)

(52) U.S. Cl.
USPC .......................................................... 709/247

(58) Field of Classification Search .............. 709/220, 709/201, 219, 217, 218, 247–249, 238, 232, 709/224, 226, 203, 245; 707/501, 505, 506, 707/530, 513; 715/215, 735, 736, 740; 370/230, 370/231, 232, 352, 389, 229, 254, 360
See application file for complete search history.

(56) References Cited

U.S. PATENT DOCUMENTS

| | | | | |
|---|---|---|---|---|
| 6,678,250 B1 * | 1/2004 | Grabelsky et al. | ............ | 370/241 |
| 6,754,221 B1 * | 6/2004 | Whitcher et al. | ............. | 370/401 |
| 8,024,483 B1 * | 9/2011 | Rothstein et al. | ............. | 709/247 |
| 2002/0059463 A1 * | 5/2002 | Goldstein | ..................... | 709/247 |
| 2002/0131366 A1 * | 9/2002 | Sharp et al. | ................... | 370/235 |
| 2003/0028606 A1 * | 2/2003 | Koopmans et al. | ............ | 709/206 |
| 2006/0184652 A1 * | 8/2006 | Teodosiu et al. | ............. | 709/221 |

* cited by examiner

*Primary Examiner* — Joseph Avellino
*Assistant Examiner* — Mark O Afolabi
(74) *Attorney, Agent, or Firm* — Turocy & Watson, LLP

(57) ABSTRACT

The claimed subject matter relates to an architecture that can actively regulate associated gateways in connection with lossless application-level compression. In particular, the architecture can monitor a flow of messages that enter and/or traverse a gateway in order to determine a bandwidth utilization of an associated network due to the messages. The architecture can also monitor the aggregate messages load for the associated network due to all gateways. In particular, the architecture can regulate lossless application-level compression at that gateway or all of the gateways in the set as a function of the bandwidth utilization and/or the aggregate message load. Accordingly, compression features can be activated or deactivated based upon a utilization threshold parameter, and gateways can be regulated uniformly or independently from one another.

20 Claims, 11 Drawing Sheets

AGGREGATE CONTROL FOR APPLICATION-LEVEL COMPRESSION

CROSS-REFERENCE TO RELATED APPLICATIONS

This application is related to co-pending U.S. patent application Ser. No. 12/259,628 filed on Oct. 28, 2008, and entitled, "APPLICATION-LEVEL LOSSLESS COMPRESSION." The entirety of this application is incorporated herein by reference.

TECHNICAL FIELD

The present application relates generally to information application-level lossless compression of messages in a computer network, and more specifically to controlling the compression of messages based upon a message load.

BACKGROUND

In conventional systems, data compression or source coding is the process of encoding information using fewer bits than an uncompressed representation would use through use of specific encoding schemes. Compression is useful because it helps reduce the consumption of expensive resources, such as storage space or transmission bandwidth. On the downside, compressed data must be decompressed to be used, and this extra processing may be detrimental to some applications. This difficulty is especially true given that most compression or encoding algorithms today compress data at the bit level.

For example, conventional lossless compression algorithms seek to leverage statistical redundancies extant in the bit representations (e.g., 1's and 0's) that compose various types of data. Lossless compression schemes are reversible so that the original data can be reconstructed exactly as it existed prior to encoding. An example of lossless compression is ZIP file format, which is often employed for compressing documents or other data entities or data formats that require accurate recreation at the bit level. On the other hand, lossy encoding can provide greater compression ratios at the expense of some data loss. Generally, lossy compression is employed in connection with images, audio, or video files, sacrificing some degree of fidelity to attain a higher level of compression. Examples of lossy compression are MP3, MPEG, JPG formats. Both forms of compression have relatively rigid maximum compression ratios.

In the domain of computer network systems, bit-level compression of data can reduce bandwidth utilization, which can lessen the payload of traffic through potential resource bottlenecks. The trade-off is an increase in the required computational power to perform the compression/decompression algorithms, which commensurately increases the costs associated with various network equipment. In many instances, the cost-benefit analysis of this increased expense is not justified, especially when the occurrence of a resource bottleneck is a relatively low-probability event. For example, consider a network monitoring system (NMS) that tracks alarm messages from a network or a particular portion of a network.

Typically, the NMS will received alarm messages from network equipment (e.g., access multiplexers) when a fault condition arises with or is detected by the equipment. These fault conditions are often isolated events, and do not overly burden the NMS. However, in certain situations, "alarm storms" can arise. Alarm storms typically occur when many alarm messages are generated in a relatively short period of time, often due to a common or related set of events, e.g. due to malicious denial of service attacks or even due to natural forces such as weather. During alarm storms or other times of high alarm message input to a gateway of a NMS, the NMS is conventionally forced to shut down or discard much information that could be helpful to an upstream analysis system that might receive alarms from multiple NMS's to determine the nature of the problem. Accordingly, it would be beneficial to employ compression techniques to lessen the strain on the NMS during such times, yet bit-level compression techniques, with their limited compression ratios and higher additional costs do not appear adequate to address these or other suitable situations.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can regulate gateways associated with a network in connection with application-level lossless compression. In accordance therewith and to other related ends, the architecture can monitor a flow rate of messages through a gateway in order to calculate a bandwidth utilization of a network due to the messages that traverse one or more gateways. In addition, the gateways can be regulated in connection with application-level lossless compression of the messages as a function of the bandwidth utilization.

For example, when bandwidth utilization rises above a certain utilization threshold, then the architecture can instruct the gateways to activate compression, potentially until the compression activities reduce the bandwidth utilization to a level below the utilization threshold. Moreover, once below some related utilization threshold, the architecture can instruct the gateways to deactivate compression.

Beyond merely activating or deactivating compression among the gateways, instructions relating to compression that are transmitted to the gateways can indicate other features as well. For instance, a gateway can be instructed to perform compression only on certain types of messages or to avoid compressing certain types of messages. Thus, the instruction can activate or deactivate compression as well as increase or decrease the current level of compression (e.g., the fraction or percentage of incoming messages that are compressed). Determining which messages to compress (and/or which should not be compressed) can potentially be based upon a statistical composition of incoming messages, based upon a priority of the incoming messages, or some other measure or criterion. Furthermore, gateways can be provided instructions either uniformly or independently. Hence, instructions can be configured to apply to all gateways, while other instructions can be configured to affect only one or a subset of the gateways.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equiva-

DETAILED DESCRIPTION

Figure 1:
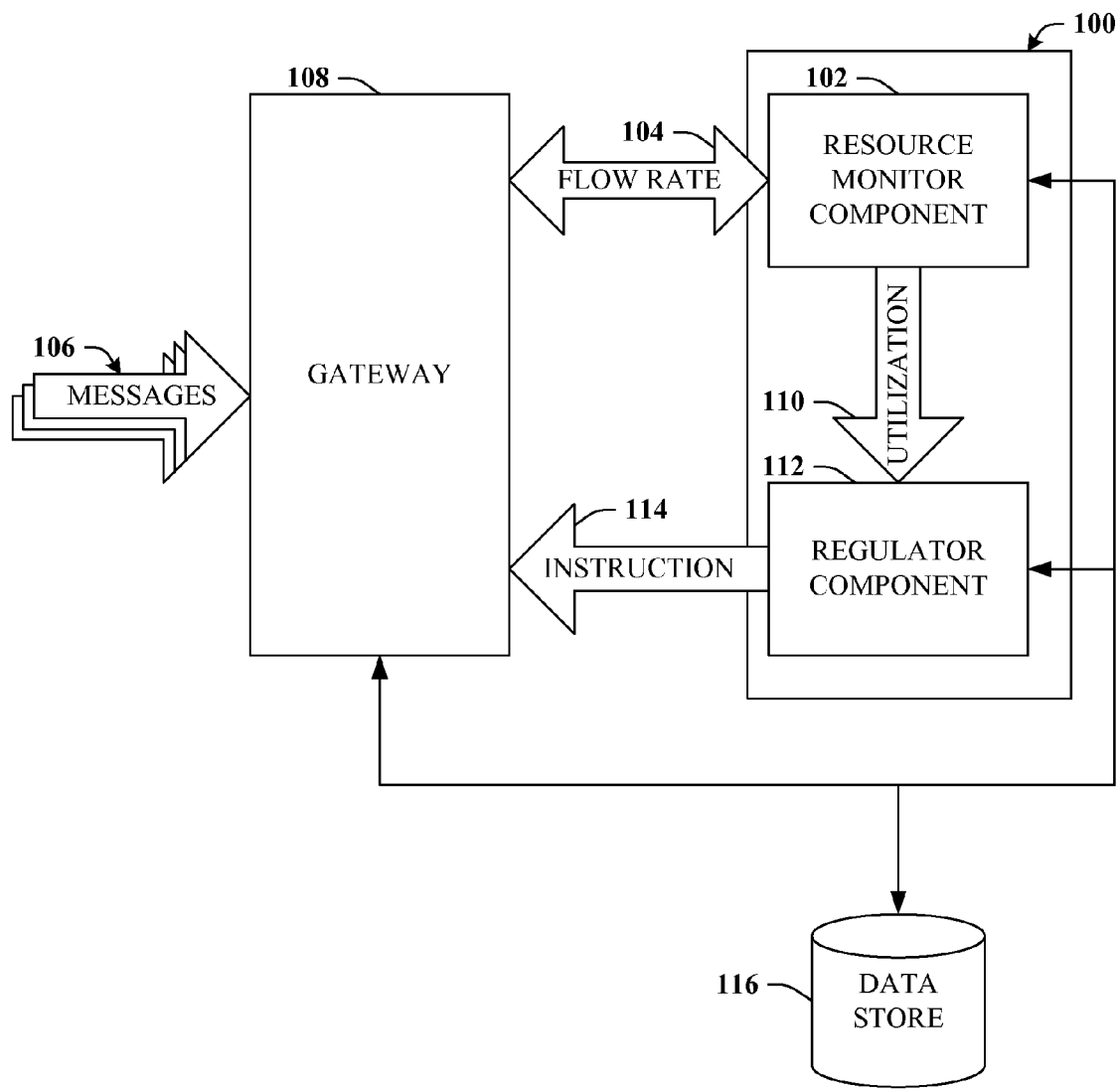
FIG. 1 is a block diagram of a system that can actively regulate application-level lossless compression in connection with a gateway associated with a network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", or the like can refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, system 100 that can actively regulate application-level lossless compression in connection with a gateway associated with a network is depicted. Generally, application-level compression differs from bit-level compression techniques that seek to reduce the number of bits necessary for representing data. In particular, application-level lossless compression relates to compressing application instances (e.g., messages) at the application data level, with little or no loss of application level data upon decompression, which is further detailed herein, in particular by subject matter incorporated by reference.

However, as a brief explanation, lossless application-level compression can be accomplished in the following manner. Upon receiving a message (e.g., message 106) that includes application data (e.g., certain application-specific data fields) and non-application data (e.g. time stamp information or the like), the application-level compression can be achieved by comparing the application data of received message to that for stored messages. If no match is found, then the received message can be stored to a buffer and a buffer timer can be started, which will expire after a buffer period. On the other hand, if a match is found, then the received message includes identical application data as that for the stored message. Accordingly, a message count associated with the stored message can be incremented by 1, and the received message discarded. Upon expiration of the buffer period, the corresponding stored message along with the associated message count can be packaged into a message pattern and forwarded along.

At the decompression side, the message pattern can be received and the stored message contained therein can be extracted to create an original message. The original message can be copied to produce a number of duplicate messages based upon the message count. Since application data for the original message and all duplicates will be identical, only the non-application (e.g., time stamp information) data need be reconstituted separately. This can be achieved by adding a timing offset to the time stamp of the original message in a cumulative manner. The timing offset can be determined as a function of the message count and the buffer period, or in some other suitable manner.

In this manner, it should be appreciated that substantially any number of related incoming messages can be compressed into a message pattern that, often, is approximately the same size as a single message. Hence, any given intermediary system that is subject to potential resource utilization bottlenecks, including but not limited to a network monitoring system (NMS), can implement the compression features at one edge of the potential bottleneck, and the decompression features at the other edge. Thus, bandwidth or other network resources can remain within acceptable levels even during periods of high usage, such as during alarm storms, for instance. Moreover, because the compression employed is at the application level, actual traffic (e.g., the number of messages) can be reduced through the potential bottleneck. In contrast, bit-level compression would likely result in merely a reduction in the bit payload of each message rather than in the number of messages; is limited in compression ratio; and is likely more costly in terms necessary processing power.

In accordance with regulating compression, system 100 can include resource monitor component 102 that can measure flow rate 104 of messages 106 that enter and/or traverse gateway 108. In the broadest sense, gateway 108 can be substantially any portal, checkpoint, or exchange for network traffic. More particularly, gateway 108 can be a device or component that acts as an intermediary between two or more networks and/or functions as an entry or exit point for network traffic. Accordingly, as with conventional networking-based gateways, gateway 108 can convert or translate from one protocol or format to another and/or can provide features or aspects relating to identification, verification, or authentication.

In an aspect of the claimed subject matter, messages 106 can be a NMS alarm messages, which can, e.g., indicate a failure condition or malfunction associated with a disparate network resource. Thus, to provide concrete illustrations, messages 106 are generally described herein in the context of an NMS alarm message, however, it should be appreciated and understood that messages 106 can relate to other applications as well.

Resource monitor component 102 can measure flow rate 104 by counting the number of message 106 that exit gateway 108 over a given period of time. Additionally or alternatively, flow rate 104 can be a measure of the number of messages that enter gateway 108, which can in some cases vary, such as when compression or filtering features are employed. Regardless, based upon flow rate 104, resource monitor component 102 can calculate bandwidth utilization 110 associated with messages 106 that traverse gateway 108. In other words, resource monitor component 102 can determine or identify the amount of network resources that must be utilized to sustain messages 106 at the current flow rate 104.

Appreciably, if bandwidth utilization 110 is very high, then various difficulties can arise with gateway 108 or the network associated therewith. However, during times of high bandwidth utilization 110, rather than seeking to limit the number of messages 106 received by gateway 108, such messages 106 can be compressed or filtered as described herein. Thus, bandwidth utilization 110 can be reduced even without a commensurate reduction in the number of messages 106 received by gateway 108.

To these or other related ends, system 100 can further include regulator component 112 that can regulate gateway 108 in connection with application-level lossless compression of messages 106. Moreover, such compression regulation can be determined as a function of bandwidth utilization 110, and communicated to gateway 108 as instruction 114. For example, during periods of high bandwidth utilization 110, regulator component 112 can transmit instruction 114 ordering gateway 108 to begin or increase compression, whereas instruction 114 can relate to ending or decreasing compression when bandwidth utilization is low or decreases, which is further detailed in connection with FIG. 2, infra.

In addition, system 100 can further include or be operatively connected to data store 116. Data store 116 is intended to be a repository of all or portions of data, data sets, or information described herein or otherwise suitable for use with the claimed subject matter. Data store 116 can be centralized, either remotely or locally cached, or distributed, potentially across multiple devices and/or schemas. Furthermore, data store 116 can be embodied as substantially any type of memory, including but not limited to volatile or non-volatile, sequential access, structured access, or random access and so on. It should be understood that all or portions of data store 116 can be included in system 100, or can reside in part or entirely remotely from system 100.

Figure 2:
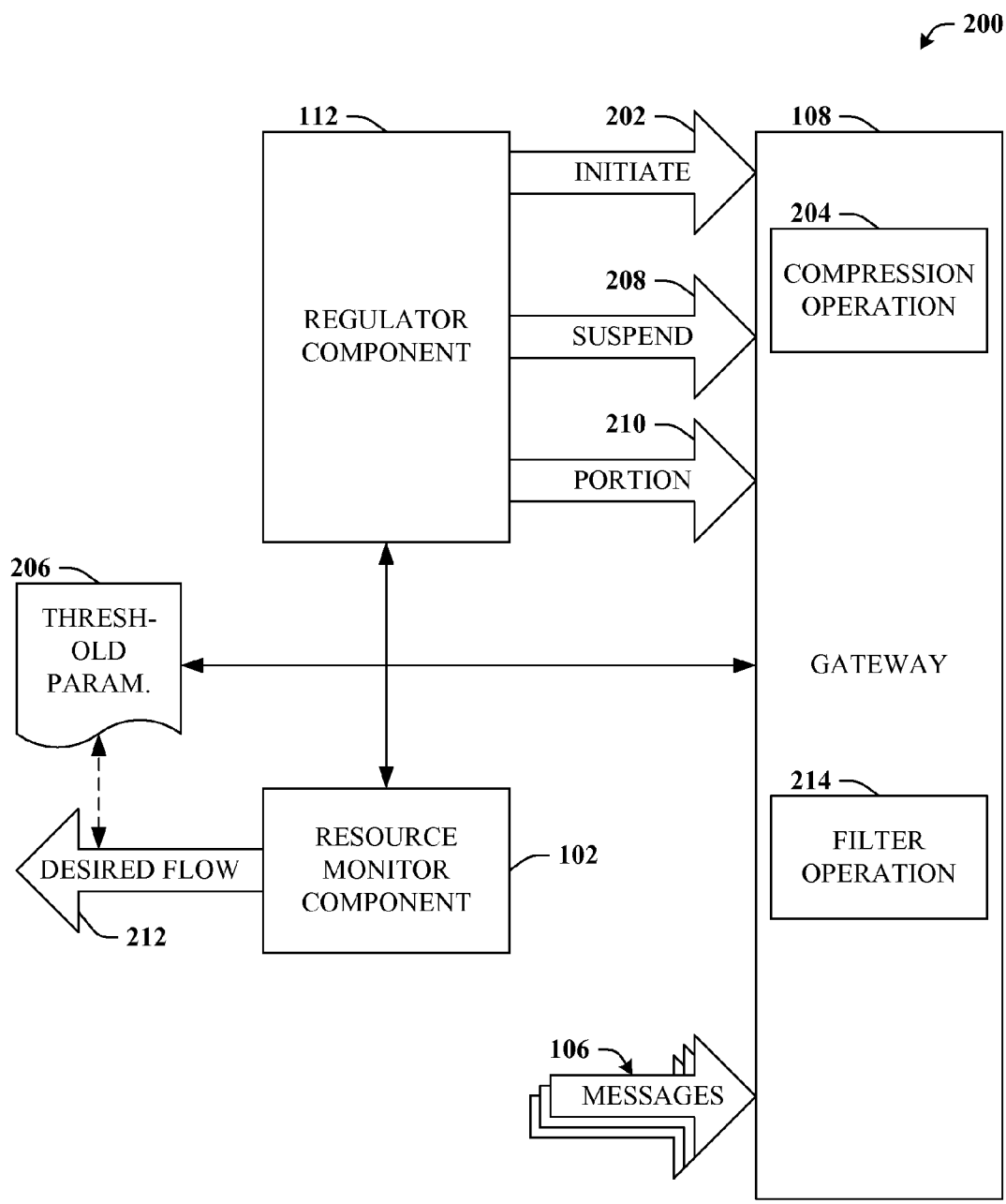
FIG. 2 illustrates a block diagram of a system that provides additional features in connection with regulating lossless application-level compression.

Turning now to FIG. 2, system 200 that illustrates additional features in connection with regulating lossless application-level compression is provided. Typically, system 200 can include resource monitor component 102 that can determine bandwidth utilization 110, and regulator component 112 that can regulate gateway 108 according to bandwidth utilization 110, as substantially described supra. In more detail, system 200 illustrates various examples of instruction 114 from FIG. 1, denoted here as elements 202, 208, and 210, respectively.

In an aspect, regulator component 112 can issue initiation instruction 202 in order to instruct gateway 108 to initiate application-level lossless compression of messages 106, e.g. by way of compression operation 204. Typically, regulator component 112 will issue initiation instruction 202 when the bandwidth utilization 110 is greater than or equal to threshold parameter 206. Thus, it can be readily appreciated that threshold parameter 206 can represent a maximum desired bandwidth utilization, such that utilization 110 that is greater than the threshold 206 can activate compression features, which will effectively reduce utilization 110 and/or flow rate 104. Threshold parameter 206 can be defined based upon current operating conditions, known events (e.g. scheduled maintenance, usage peaks/troughs . . . ), inferences or predictions relating to future or imminent events, recommended or predefined values, or combinations thereof.

As another example, regulator component 112 can issue suspend instruction 208 to gateway 108 to suspend application-level lossless compression of messages 106. Generally, suspend instruction 208 will be issued when bandwidth utilization 110 is lower than (or equal to) threshold parameter 206. Alternatively, suspend instruction 208 can be issued when bandwidth utilization 110 falls below a recovery threshold (not shown) that is generally some percentage or fraction of threshold parameter 206 in order to mitigate "whipsaw" instructions 114 that can develop when bandwidth utilization 110 hovers near the value for threshold parameter 206.

In addition, regulator component 112 can instruct gateway 108 to compress a portion of messages 106, which is denoted by portion instruction 210. In accordance therewith, regulation component 112 can apply finer degrees of tuning to compression of messages 106 than simply switching compression on or off. More specifically, portion instruction 210 can relate to compressing only a certain number or percentage of messages 106. Typically, portion instruction 210 will be issued when bandwidth utilization 110 is greater than threshold parameter 206, thereby activating compression or increasing the proportion of messages 106 that are compressed, yet doing so in a manner that is selective or only as needed. For example, regulator component 112 can set the compression portion inversely proportional to bandwidth utilization 110.

However, it should be appreciated that portion instruction 210 can be issued when bandwidth utilization 110 is less that threshold parameter 206 as well. For example, consider the case in which compression has been activated and, as a result, the indication of bandwidth utilization 110 decreases below threshold parameter 206. In that case, rather than completely suspending compression, the number of messages 106 compressed at gateway 108 can be reduced.

It should also be appreciated that regulator component 112 can determine the proper proportion of messages 106 to compress based upon a desired utilization. As with threshold parameter 206, the desired utilization can be based upon current operating conditions, known events, inferences or predictions relating to future or imminent events, recommended or predefined values, or combinations thereof. In fact, given that threshold parameter 206 generally represents a utilization value above which compression is activated, the desired utilization will generally be equal to or somewhat below threshold parameter 206.

In an aspect of the disclosed subject matter, resource monitor component 102 can further calculate desired flow rate 212 of messages through the gateway necessary to achieve the desired utilization. In accordance therewith, regulator component 112 can instruct gateway 108 to compress a subset of messages 106 (e.g., by way of portion instruction 210) in excess of desired flow rate 212. Thus, compression can occur at gateway 108 in order to effectuate desired flow rate 212 even when the number of incoming messages 106 is greater than desired flow rate 212.

It should be appreciated that in some aspects, regulator component 112 can instruct gateway 108 to compress a particular type of message 106, or instruct gateway 108 to forego compression of a particular type of message 106. Thus, rather than merely compressing some proportion of incoming messages 106, regulator component 112 can select which types of messages 106 should or should not be compressed. The determination or inference employed to select certain types of messages 106 for compression or to avoid compression can be based upon the priority of the message or other relevant characteristics. Additionally or alternatively, the type can be selected based upon the statistical composition of incoming messages 106. For instance, if regulation component 112 determines or infers 20% of incoming messages 106 should be compressed (e.g., to reduce bandwidth utilization 110 by approximately 20%), then a message type that makes up 20% of incoming messages 106 can be selected, leaving other message types unaffected. As a converse example, regulator component 112 could instruct gateway 108 to compress all incoming messages 106 but for the aforementioned message type, say, when it is desired to reduce bandwidth utilization by 80%.

In addition, regulator component 112 can be configured with a further capability to instruct gateway 108 to perform filter operation 214. Generally, filter operation 214 results in all or a subset of incoming messages 106 to be discarded. As one example of filter operation 214, gateway 108 can buffer an incoming message for a particular amount on time, and then compare the other incoming messages to stored messages. If a match is detected, then the messages are related (e.g., they have identical application data), and the later arriving message is discarded. If no match is found, then the incoming message is stored to the buffer.

Although filter operation 214 is not typically preferred over compression operation 204 due to potential data loss, there can exist certain situations in which it is prudent and/or necessary. For example, due to the severity of an alarm storm, it might be necessary to perform filter operations 214 from time-to-time to avoid overloading or shutting down the network associated with gateway 108. It should be understood that, like compression operation 204, filter operation 214 can be applied only to a particular type of message. Likewise, in other cases, filter operation 214 can be applied to all messages 106 except a particular type, again based upon a priority of the message or some other suitable criterion or criteria.

Figure 3:
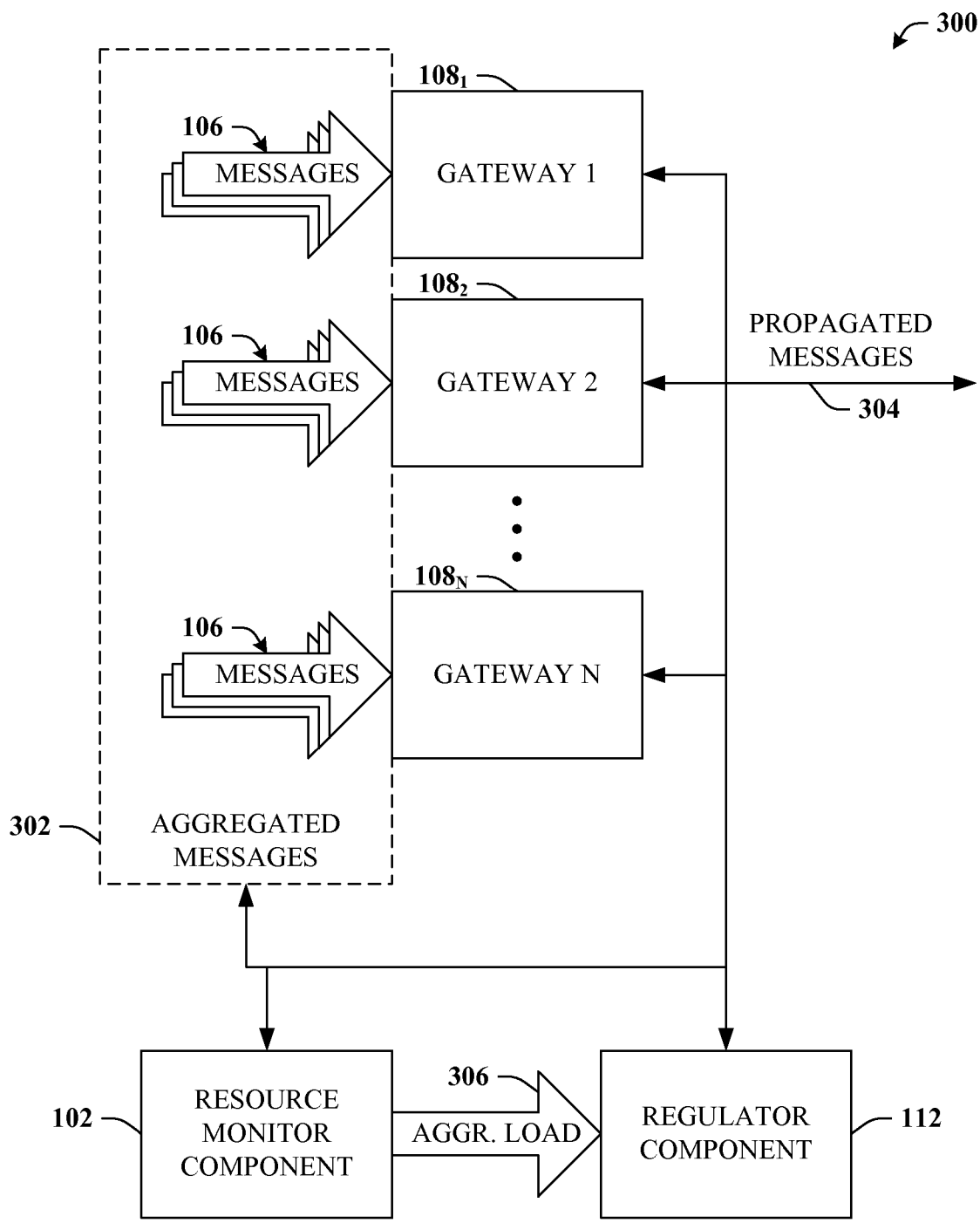
FIG. 3 provides a block diagram of a system that can regulate lossless application-level compression in connection with a set of gateways.

With reference to FIG. 3, system 300 that can regulate lossless application-level compression in connection with a set of gateways is illustrated. In particular, the set of gateways are, here, depicted as gateways $108_1$-$108_N$, where can be substantially any positive number greater than or equal to 2, yet are still referred to either collectively or individually as gateway(s) 108. Each gateway 108 can receive one or more messages 106 that can relate to application-specific data. Collectively, all messages that enter one of the gateways 108 from the set can be denoted aggregated messages 302. Messages 106 that are propagated through one of the gateways 108 can be described as propagated messages 304. It is understood that aggregated messages 302 need not necessarily be the same in quantity as propagated messages 304 given that some messages 106 can be compressed or filtered, e.g. at one of the gateways 108.

As depicted, system 300 can include resource monitor component 102 and regulator component 112 as substantially described supra. In addition to the previous description, resource monitor component 102 can further measure aggregate message load 306 that is determined based upon a number of propagated messages 304, or in some cases a number of aggregated messages 302. Likewise, regulator component 112 can further regulate application-level lossless compression of aggregated messages 302. In particular, regulator component 112 can regulate compression for each gateway 108 included in the set of gateways based upon aggregate message load 306.

In an aspect of the disclosed subject matter, regulator component 112 can regulate application-level lossless compression of aggregated messages 302 in a manner that is uniform for each gateway 108 from the set of gateways. In other words, compression can be activated or deactivated uniformly for all gateways. Moreover, when compressing only a portion of incoming messages 106, the same portion or the same message type can be compressed uniformly for each gateway 108. In another aspect, regulator component 112 can regulate application-level lossless compression of aggregated messages 302 independently for each gateway 108 in the set of gateways. Appreciably, in both cases, regulating gateways uniformly or independently can apply to filtering operations 214 as well as compression operations 204.

It should be appreciated that providing the capability to operate in connection with multiple gateways 108 adds new dimensions over implementing the claimed subject matter with a single gateway 108. For example, with multiple gateways 108, any given gateway 108 can operate at a higher flow rate 104 than might be desired, even while the overall aggregated messages 302 or aggregate message load 306 remains below a normal working threshold. On the other hand, all gateways 108 can be receiving slightly less traffic than what might be determined normal for a single gateway 108, yet in the aggregate, the message load 306 processed by all gateways 108 can still create a strain on the associated network. However, as can be readily appreciated, resource monitor component 102 and/or regulator component 112 can mitigate these difficulties.

Figure 4:
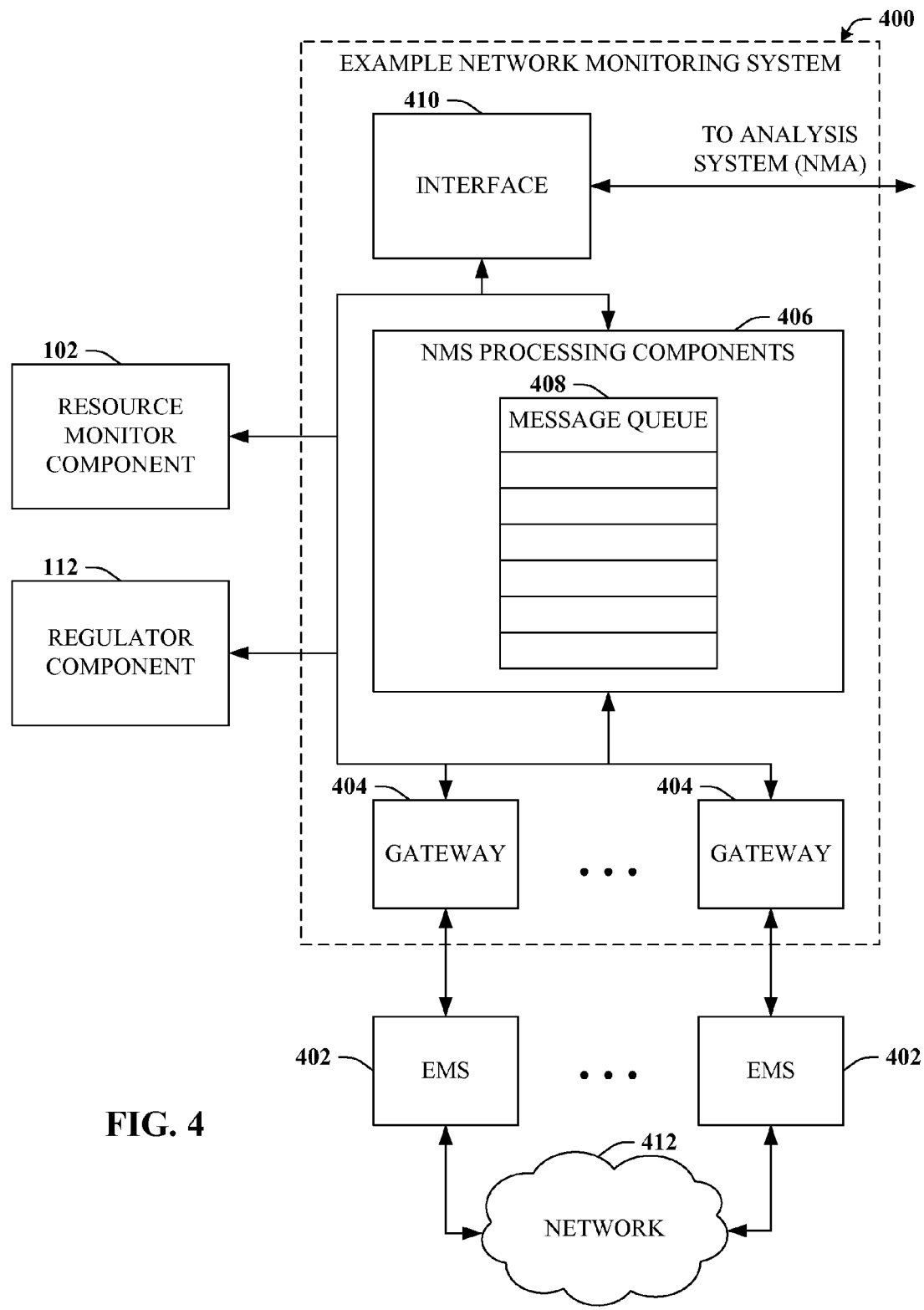
FIG. 4 is a block diagram illustrating an example of interfacing and/or interacting with example network monitoring system 400.

Referring now to FIG. 4, interfacing and/or interacting with example network monitoring system 400 is depicted. As introduced above, the claimed subject matter can be utilized to regulated NMS alarm messages, and is thus applicable to a NMS. Thus, resource monitor component 102 and/or regulator component 112 can be included in or operatively coupled to NMS 400. It should be underscored yet again that the claimed subject matter can be applicable to other types of systems or networks (e.g., systems that include a potential resource bottleneck due to an overload of messages), beyond the exemplary NMS provided here.

Generally, an objective of NMS 400 can be to track alarm messages from a network (e.g., network 412) or a particular portion of a network. Network 412 typically includes the network equipment, such as access multiplexers, that can create the alarm messages (e.g., messages 106) upon detection of a failure or malfunction event. These alarm messages can be transmitted to one or the element management systems (EMS) 402, which are typically vendor specific. Hence, each EMS 402 can monitor a subset of network 412 specific to the network equipment of a given vendor. Upon receipt of an alarm message, EMS 402 forwards the alarm message to NMS 400, where it can be received by one of the gateways 404.

Gateway 404 can then forward the alarm message to NMS processing components 406, where the alarm message is, inter alia, processed and placed in message queue 408. Thereafter, the alarm messages is delivered to interface 410, which can be operated by, e.g., a Java-Based Broadband Operating System (JBBOS). From there the alarm message is transmitted upstream, potentially through another gateway, to a network analysis system (NMA) for aggregate analysis of the alarm messages, potentially those received from multiple NMS instances.

To implement compression, various components (e.g., a compression component) can be included in gateways 404, which can be activated by regulator component 112, as described herein. Likewise, resource monitor component 102 can monitor flow rates 104 associated with the various gateways 404. Additionally or alternatively, resource monitor component 102 can aggregate message load 306 by examining message queue 408. If alarm messages are compressed at one or more gateway 404, then these can be decompressed (e.g., by a decompression component) at the reverse edge before being propagated to the NMA.

Figure 5:
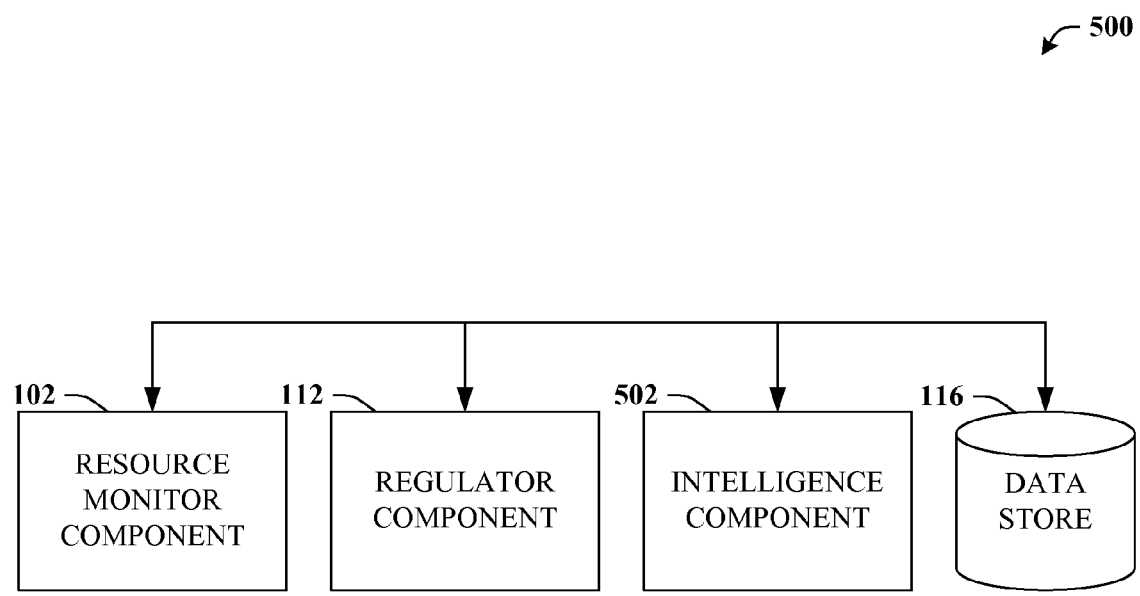
FIG. 5 illustrates a block diagram of a system that can provide or aid in various inferences.

Turning now to FIG. 5, system 500 that can provide or aid in various inferences is illustrated. Typically, system 500 can include resource monitor component 102 that can determine bandwidth utilization associated with messages that traverse a gateway, as substantially described supra. Furthermore, system 500 can also include regulator component 112 that can regulate compression of the messages as a function of the bandwidth utilization, also as detailed supra.

In addition, system 500 can further include intelligence component 502 that can provide for or aid in various inferences or determinations. It is to be appreciated that intelligence component 502 can be operatively coupled to all or some of the aforementioned components, e.g. 102 and 112. Additionally or alternatively, all or portions of intelligence component 502 can be included in one or more components described herein. Moreover, intelligence component 502 will typically have access to all or portions of data sets described herein, such as access to data store 116, and can furthermore utilize previously determined or inferred data.

For example, intelligence component 502 can aid resource monitor component 102 by intelligently determining or inferring a forecasted flow rate 104. For example, based upon the types or periodicity of messages 106 received, various inferences, potentially based upon machine learning techniques, can be utilized to predict an increase or decrease in message flow 104, either in the aggregate or for individual gateways. In addition, intelligence component 502 can aid regulator component 112 by intelligently determining or inferring which gateways to which to direct compression instructions, e.g., when regulating gateways independently. As another example, intelligence component 502 can intelligently determine or infer which types of messages to filter or compress based upon portion instruction 210 in order to achieve desired flow rate 212 or the desired utilization. Such inferences can be based upon allocation, priority, or other criteria.

In accordance therewith, in order to provide for or aid in the numerous inferences described herein or otherwise suitable, intelligence component 502 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 6, 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
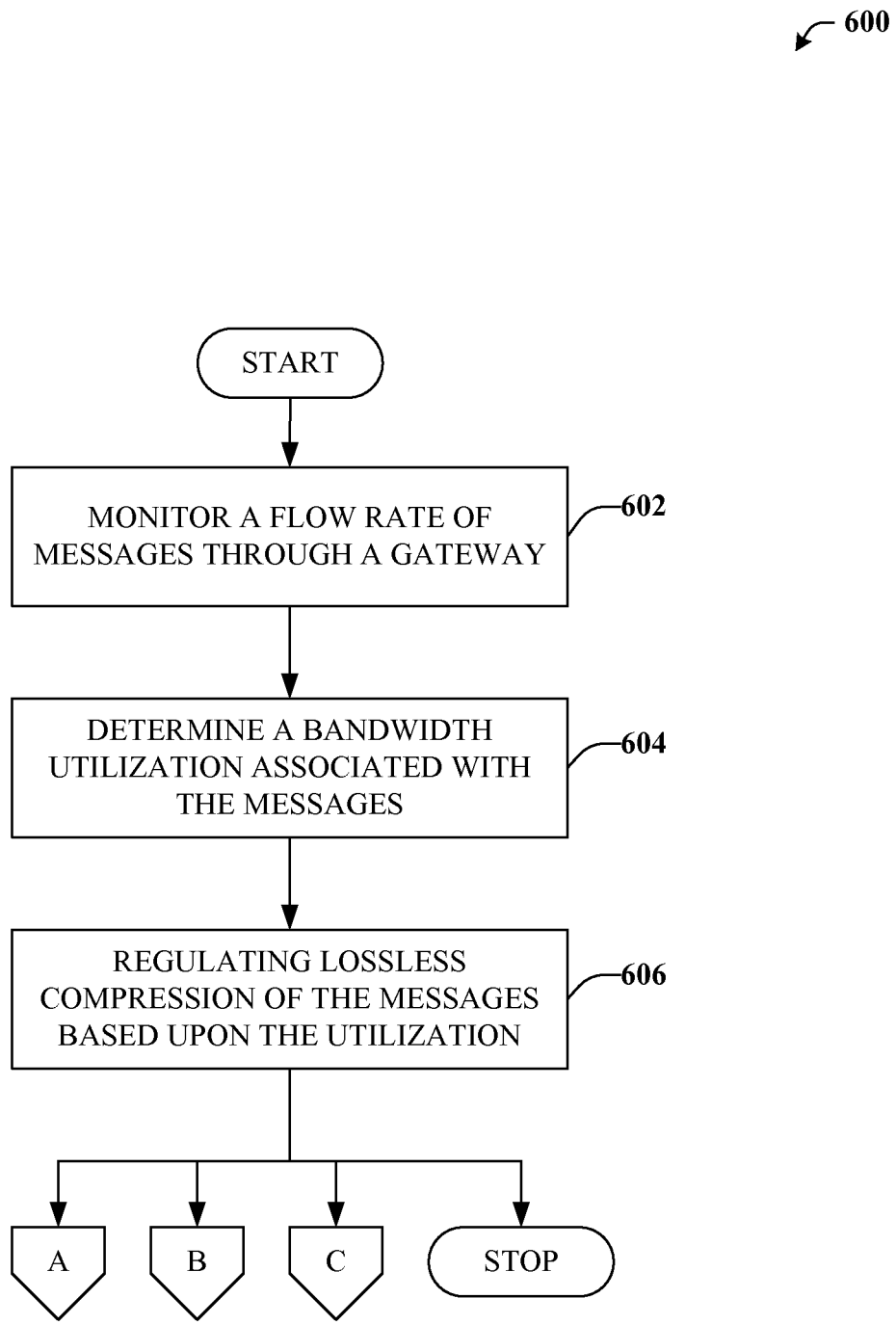
FIG. 6 depicts an exemplary flow chart of procedures that define a method for regulating a gateway in connection with application-level lossless compression of messages.

Turning now to FIG. 6, exemplary method 600 for regulating a gateway in connection with application-level lossless compression of messages is depicted. In general, at reference numeral 602, a flow rate of messages through a gateway can be monitored. The flow rate can refer to the amount of messages received by the gateway or to the amount of messages forwarded or propagated by the gateway. In some cases, two disparate flow rates can be utilized, one for each measure.

At reference numeral 604, a bandwidth utilization associated with the messages traversing the gateway can be determined. The bandwidth utilization can be a measure of the resources used to accommodate the message traffic from the gateway relative to the available resources. Accordingly, as the number of messages traversing the gateway increases, the bandwidth utilization typically increases commensurately and vice versa. At reference numeral 606, lossless application-level compression of the messages can be regulated based upon the bandwidth utilization. For example, higher amounts or forms of compression can be employed to offset higher bandwidth utilization, while lower amounts or forms of compression, or no compression at all, can be employed when the bandwidth utilization is low.

Figure 7:
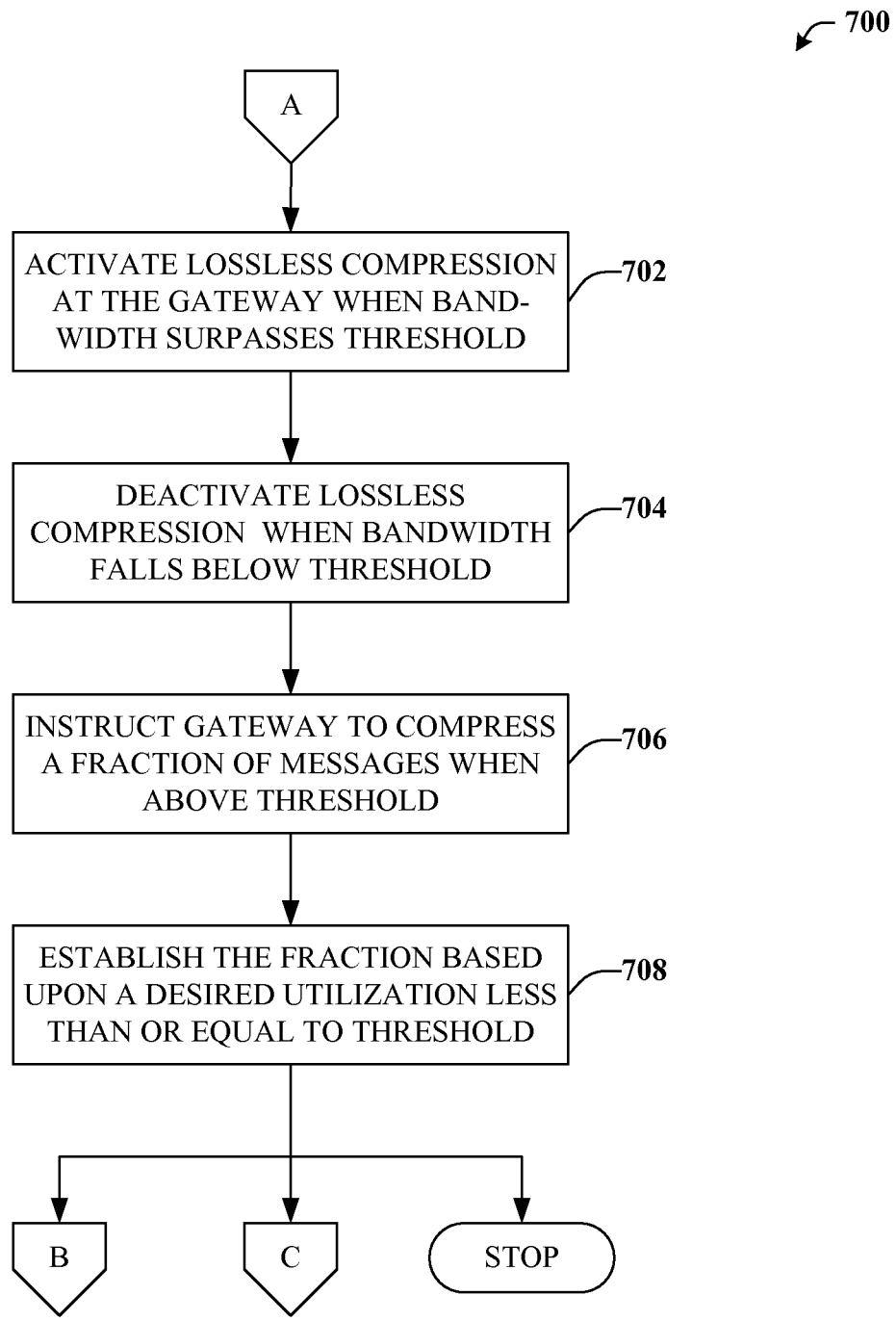
FIG. 7 illustrates an exemplary flow chart of procedures that define a method for employing a threshold parameter in connection with regulating compression features.

With reference to FIG. 7, exemplary method 700 for employing a threshold parameter in connection with regulating compression features is provided. According to the diagram, at reference numeral 702, lossless application-level compression can be activated at the gateway. Such compression can be activated when the bandwidth utilization surpasses a threshold parameter. The threshold parameter can relate to a measure of utilization, above which is considered highly loaded and/or below which is considered normal or optimal. Thus, when the bandwidth utilization rises above the threshold parameter, compression features can be activated or increased in order to decrease the bandwidth utilization.

At reference numeral 704, lossless application-level compression can be deactivated at the gateway when the utilization falls below the threshold parameter. For example, when the bandwidth utilization decreases, either due to compression activity or a decline in the messages received by the gateway and/or the flow rate, to at least a level at or below the threshold parameter, then compression can be reduced or deactivated. At reference numeral 706, the gateway can be instructed to compress a fraction of the messages when the bandwidth utilization surpasses the threshold parameter. Accordingly, selective compression can be performed such that only particular subsets of messages are compressed or, conversely, all but one or more particular subsets of messages are compressed. At reference numeral 708, the fraction can be established based upon a desired utilization that is less than or equal to the threshold parameter.

Figure 8:
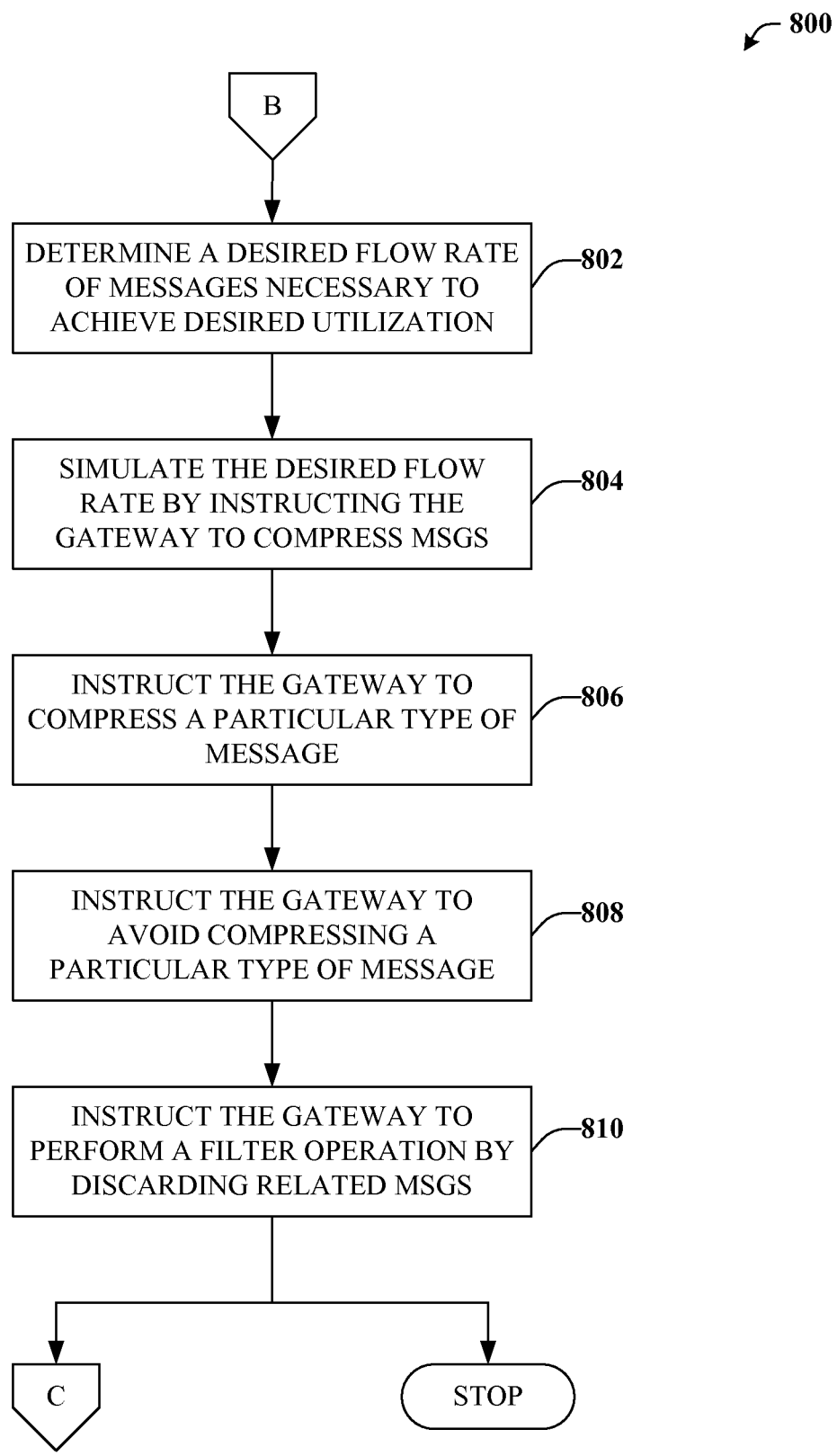
FIG. 8 is an exemplary flow chart of procedures that define a method for providing additional features in connection with lossless application-level compression.

Referring now FIG. 8, exemplary method 800 for providing additional features in connection with lossless application-level compression is illustrated. In accordance therewith, at reference numeral 802, a desired flow rate of messages through the gateway can be determined. The desired flow rate can, apart from the actual flow rate, represent an amount of propagated messages necessary to achieve the desired utilization level. At reference numeral 804, the desired flow rate of messages through the gateway can be effectuated and/or simulated by instructing the gateway to compress a subset of the messages in excess of the desired flow rate.

Next to be described, at reference numeral 806, the gateway can be instructed to compress only a particular type of messages. Conversely, at reference numeral 808, the gateway can be instructed to avoid compressing a particular type of messages. Either or both of these aspects can be based upon a composition analysis of the incoming messages, based upon a priority of the incoming messages, or some other suitable criteria. Moreover, in addition to compression, at reference numeral 810, the gateway can be instructed to perform a filter operation as well. Typically, the filter operation is enacted by discarding related messages (e.g., messages that have duplicate application data stored to a buffer).

Figure 9:
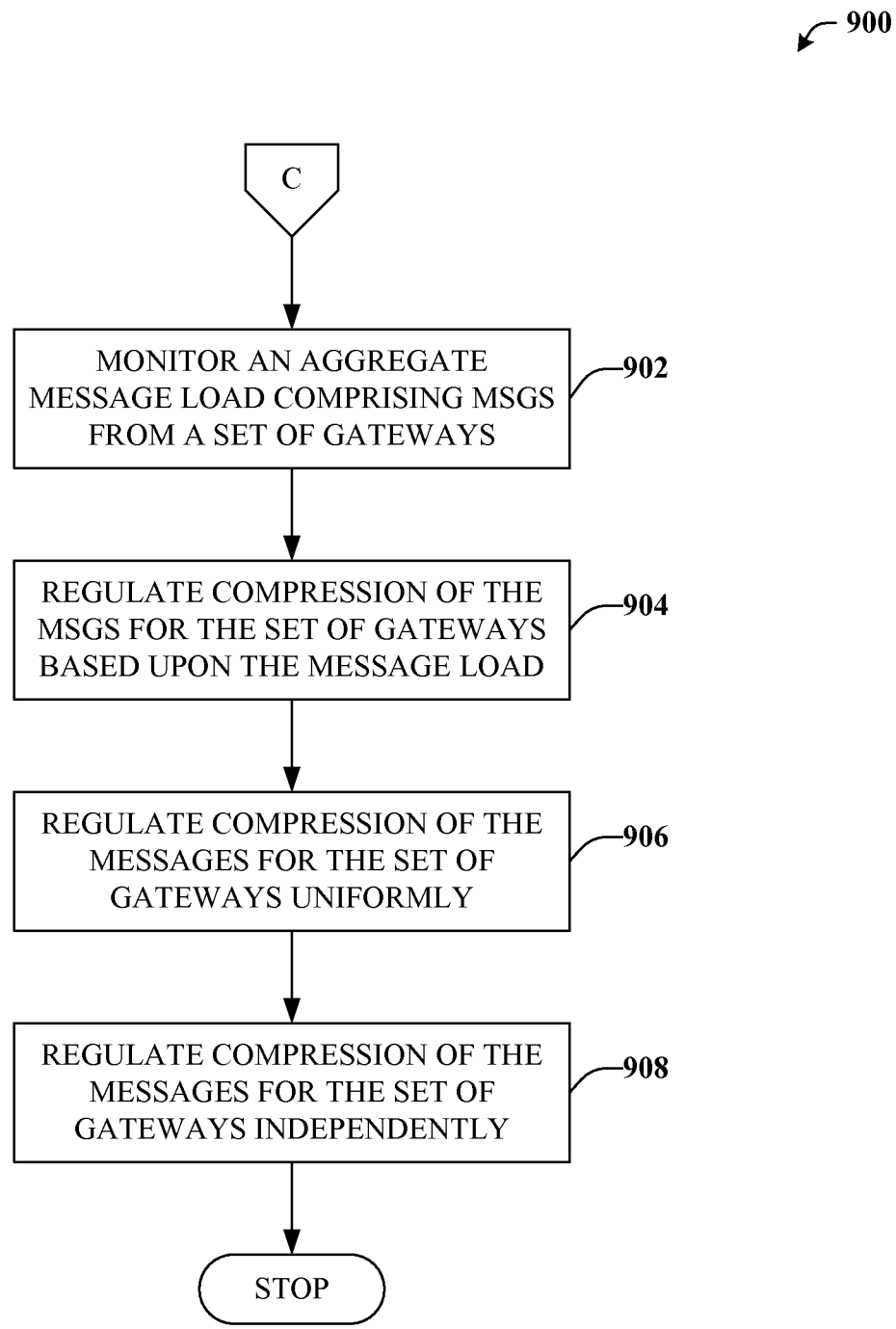
FIG. 9 depicts an exemplary flow chart of procedures defining a method for regulating a set of gateways in connection with lossless application-level compression.

Turning now to FIG. 9, exemplary method 900 for regulating a set of gateways in connection with lossless application-level compression is depicted. At reference numeral 902, an aggregate message load can be monitored. The aggregate message load can comprise or relate to messages traversing multiple gateways within a certain time period. Thus, messages traversing each gateway of the set of gateways can contribute to the aggregate message load. At reference numeral 904, lossless application-level compression of the messages for the set of gateways can be regulated based upon the aggregate message load.

At reference numeral 906, lossless application-level compression of the messages for the set of gateways can be regulated uniformly for each gateway in the set of gateways. Thus, a general command to activate compression, or a more specific command to compress certain types of messages or a certain amount of messages, or to avoid compression of certain types of messages can be applied uniformly to all gateways in the set of gateways. Additionally or alternatively, lossless application-level compression of the messages for the set of gateways can be regulated independently for each gateway in the set of gateways. In other words compression features can be applied to on gateway in the set, while different compression features or no compression can be assigned to a different gateway in the set.

Figure 10:
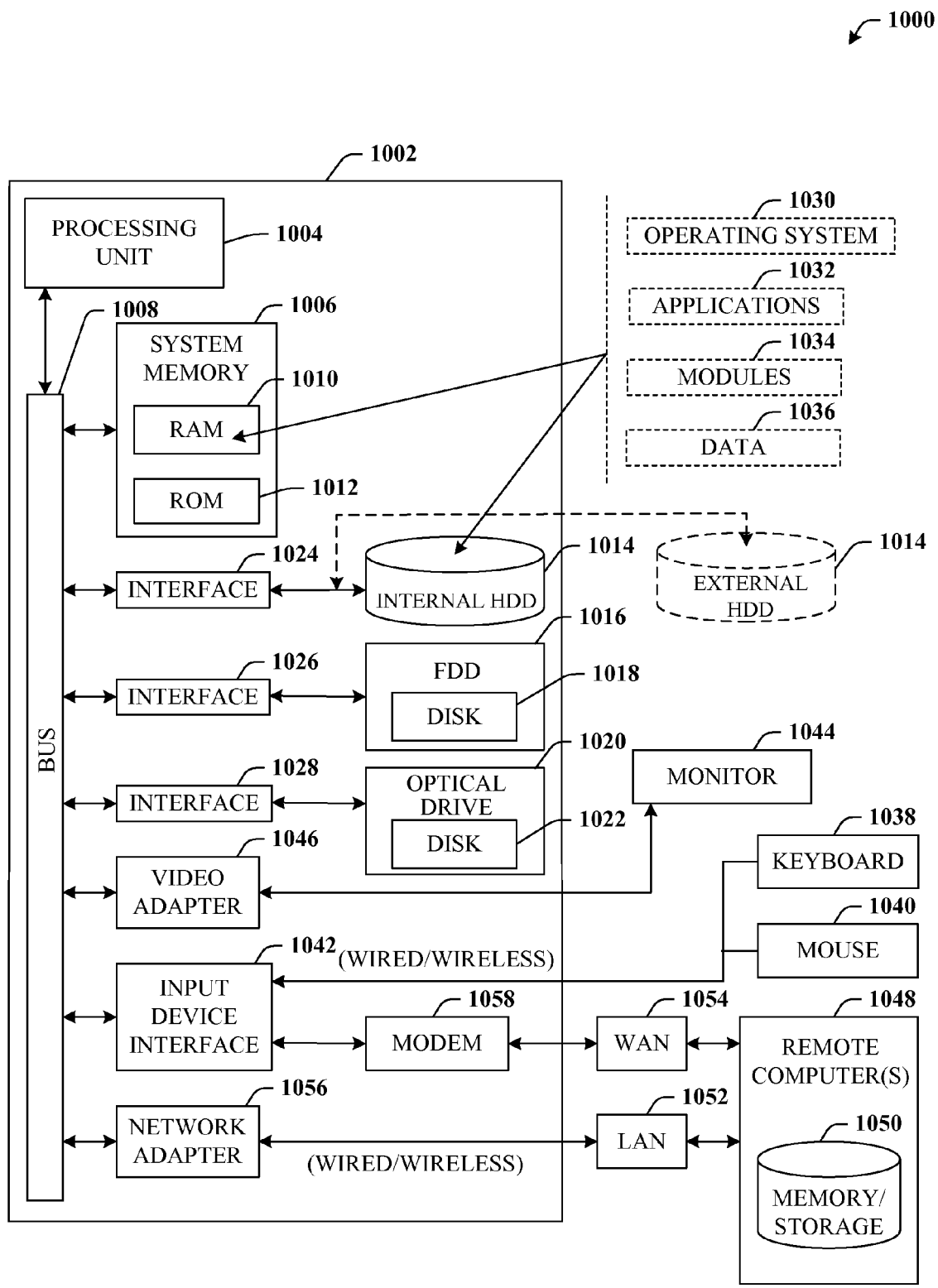
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 11:
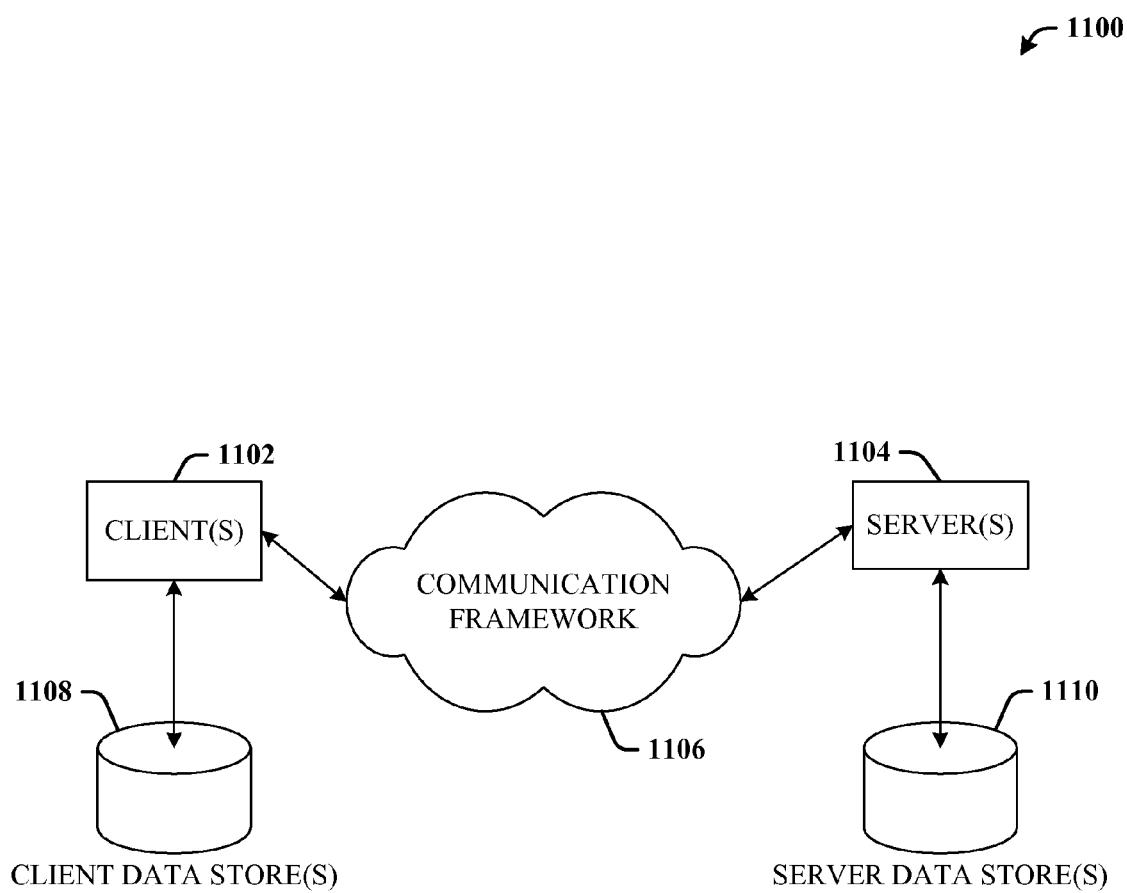
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:
1. A system, comprising:
a memory to store computer-executable instructions; and
a processor, communicatively coupled to the memory, that facilitates execution of the computer-executable instructions to perform operations, comprising:
measuring a flow rate of application-level messages that traverse a gateway device;

calculating a bandwidth utilization associated with the application-level messages that traverse the gateway device based upon the measuring; and controlling the gateway device in connection with application-level lossless compression of the application-level messages as a function of the bandwidth utilization, wherein the application-level lossless compression, with no information loss, reduces a number of the application-level messages that traverse the gateway device, and the controlling the gateway device includes instructing the gateway device to compress a portion of the application-level messages in response to the bandwidth utilization being determined to exceed a threshold parameter and the portion is determined based upon a resulting utilization that is not greater than the threshold parameter.

2. The system of claim 1, wherein the application-level messages are network monitoring system alarm messages.

3. The system of claim 1, wherein the controlling the gateway device includes instructing the gateway device to initiate the application-level lossless compression of the application-level messages in response to the bandwidth utilization being determined to satisfy a condition with respect to the threshold parameter.

4. The system of claim 1, wherein the controlling the gateway device includes instructing the gateway device to suspend the application-level lossless compression of the application-level messages in response to the bandwidth utilization being determined to fail to satisfy a condition with respect to a threshold parameter.

5. The system of claim 1, wherein the operations further include determining a flow rate of the application-level messages through the gateway device that equates to a predetermined utilization.

6. The system of claim 5, wherein the controlling the gateway device includes instructing the gateway device to compress a subset of the application-level messages to reduce the flow rate to the predetermined utilization.

7. The system of claim 1, wherein the controlling the gateway device includes instructing the gateway device to compress a specified type of application-level message.

8. The system of claim 1, wherein the controlling the gateway device includes instructing the gateway to perform a filter operation that discards a subset of the application-level messages.

9. The system of claim 8, wherein the filter operation is applied to a specified type of application-level message.

10. The system of claim 1, wherein the operations further include measuring an aggregate message load that is determined based upon an aggregate message load that includes an aggregate number of application-level messages propagated through a set of gateway devices.

11. The system of claim 10, wherein the controlling the gateway device includes controlling the application-level lossless compression of the application-level messages for the set of gateway devices based upon the aggregate message load.

12. The system of claim 11, wherein the controlling the gateway device includes controlling the application-level lossless compression of the application-level messages uniformly for multiple gateway devices included in the set of gateway devices.

13. The system of claim 11, wherein the controlling the gateway device includes controlling the application-level lossless compression of the application-level messages independently for multiple gateway devices included in the set of gateway devices.

14. A method, comprising:
monitoring, by a system including a processor, a flow rate of application-level messages through a gateway device;
determining, by the system, a bandwidth utilization associated with the application-level messages traversing the gateway device;
reducing, by the system, the flow rate of the application-level messages through the gateway device by performing lossless application-level compression on the application-level messages based upon the bandwidth utilization, wherein lossless application-level compression includes reducing a number of the application-level messages that traverse the gateway device, the reducing being without loss of data upon decompression;
determining, by the system, a fraction of application-level messages to compress based upon a predetermined utilization; and
instructing, by the system, the gateway device to compress the fraction of application-level messages in response to bandwidth utilization exceeding the predetermined utilization.

15. The method of claim 14, further comprising:
activating, by the system, the lossless application-level compression at the gateway device in response to the bandwidth utilization being higher than a threshold parameter and
deactivating, by the system, the lossless application-level compression at the gateway device in response to the bandwidth utilization being lower than the threshold parameter.

16. The method of claim 14, further comprising: instructing, by the system, the gateway device to compress a set of application-level message of a specified type in accordance with the application-level lossless compression.

17. A non-transitory computer readable storage medium storing computer-executable instructions that, in response to execution, cause a device including a processor to perform operations, comprising:
measuring a flow rate of network monitoring system alarm messages through a gateway device in order to calculate a bandwidth utilization associated with the alarm messages that traverse the gateway device; and
regulating the gateway device in connection with application-level lossless compression of the alarm messages as a function of the bandwidth utilization, wherein the application-level lossless compression, with no loss of information, reduces a number of the alarm messages that traverse the gateway, and the regulating the gateway device includes instructing the gateway device to compress a portion of the alarm messages in response to the bandwidth utilization being determined to exceed a threshold metric, the portion being determined based on the bandwidth utilization.

18. The non-transitory computer readable storage medium of claim 17, the regulating the gateway device further includes: instructing the gateway to initiate the application-level lossless compression in response to the bandwidth utilization being higher than the threshold metric.

19. The non-transitory computer readable storage medium of claim 17, the regulating the gateway device further includes: instructing the gateway to terminate the application-level lossless compression in response to the bandwidth utilization being lower than the threshold metric.

20. The non-transitory computer readable storage medium of claim 17, the regulating the gateway device further includes: instructing the gateway to discard a subset of the alarm messages that have been processed according to the application-level lossless compression.

* * * * *